(12) United States Patent
TabatabaeiSeyfi

(10) Patent No.: US 12,391,516 B2
(45) Date of Patent: Aug. 19, 2025

(54) ENERGY-SAVING ELEVATOR

(71) Applicant: SeyedAliAlNaghi TabatabaeiSeyfi, Mashhad (IR)

(72) Inventor: SeyedAliAlNaghi TabatabaeiSeyfi, Mashhad (IR)

(*) Notice: Subject to any disclaimer, the term of this patent is extended or adjusted under 35 U.S.C. 154(b) by 1241 days.

(21) Appl. No.: 17/160,495

(22) Filed: Jan. 28, 2021

(65) Prior Publication Data
US 2021/0171316 A1 Jun. 10, 2021

Related U.S. Application Data

(60) Provisional application No. 62/966,564, filed on Jan. 28, 2020.

(51) Int. Cl.
B66B 1/30 (2006.01)
B66B 1/34 (2006.01)
B66B 9/00 (2006.01)
B66B 11/04 (2006.01)
B66B 11/08 (2006.01)
F16H 9/18 (2006.01)

(52) U.S. Cl.
CPC ............ *B66B 1/302* (2013.01); *B66B 1/3476* (2013.01); *B66B 9/00* (2013.01); *B66B 11/0438* (2013.01); *B66B 11/08* (2013.01); *F16H 9/18* (2013.01)

(58) Field of Classification Search
CPC ......... B66B 1/302; B66B 1/3476; B66B 9/00; B66B 11/0438; F16H 9/18
See application file for complete search history.

(56) References Cited

U.S. PATENT DOCUMENTS 6,364,067 B1 * 4/2002 Glassey ................. B66B 19/00
187/408
2015/0314999 A1 * 11/2015 Van Keuren, II ........ B66D 3/18
254/386

OTHER PUBLICATIONS

Siewert et al. (CN 1777557 A) The Movable Counterweight-free Elevator System (Year: 2006).*
Aulanko et al. (CN 1882496 A) Method For Installed Elevator (Year: 2006).*
Mustalahti et al. (CN 1849257 A) Elevator (Year: 2006).*
Toshiaki et al (KR 20030020969 A) Elevator Device (Year: 2003).*

* cited by examiner

Primary Examiner — Jorge L Carrasquillo

(57) ABSTRACT

An energy-saving elevator. The energy-saving elevator includes an elevator car, a counterweight, a lift cable, and a hoist-type lifting mechanism. The hoist-type lifting mechanism includes a first adjustable pulley, a second adjustable pulley, and an adjustable cable interconnected between the first adjustable pulley and the second adjustable pulley. The first adjustable pulley includes a first fixed conical member with a first conical surface and a first moveable conical member with a second conical surface. The first conical surface and the second conical surface form a first trapezoid-shape groove between the first fixed conical member and the first moveable conical member. The first trapezoid-shape groove is configured to receive the adjusting cable. The first conical surface and the second conical surface are configured to hold the adjusting cable inside the first trapezoid-shape groove.

17 Claims, 12 Drawing Sheets

ENERGY-SAVING ELEVATOR

CROSS-REFERENCE TO RELATED APPLICATION

This application claims the benefit of priority from U.S. Provisional Patent Application Ser. No. 62/966,564, filed on Jan. 28, 2020, and entitled "REDUCING POWER CONSUMPTION IN AN ELEVATOR" which is incorporated herein by reference in its entirety.

TECHNICAL FIELD

The present disclosure generally relates to energy-saving systems, and particularly relates to energy saving in an elevator. The present disclosure more particularly relates to an energy-saving traction-type elevator.

BACKGROUND

During operation of an elevator, such as a traction-type elevator, the elevator may carry approximately the same mass upward and downward, and in terms of energy conservation, a power loss of an elevator may only lead to friction heating. In terms of mechanical energy, an elevator may be in an ideal status if the elevator car (load) is equal to a counterweight. Usually, a ratio of a counterweight to a car weight may be 1.5:1. However, a load may vary frequently, so it may be difficult for an elevator to get in the ideal status of weight to counterweight ratio.

A function of a counterbalance system of an elevator may be to drive a counterbalance unit and a car (load) to reach relative balance. During operation of an elevator, the elevator may make sure that a difference between a counterbalance unit and a car (load) stays at a such small value that the elevator is in a relative ideal status even if the load changes. On the contrary, if a counterbalance unit and a car of an elevator have a weight difference greater than a specific amount, the working of the elevator may inevitably result in accumulation and release of mechanical potential energy, thereby causing waste of energy.

Currently, various energy-saving traction-type elevators with a variable counterbalancing mass are available. In these energy-saving traction-type elevators, a mass of a counterbalance unit may vary by assembling and dismantling a counterbalance unit. However, these elevators may have some drawbacks. For example, existing variable counterbalancing elevators may reduce a drive moment and power of a traction machine and fulfill the aim of saving energy by decreasing a weight difference between a counterbalance unit and a car of an elevator by assembling and/or dismantling the counterbalance unit. However, the assembling and/or dismantling of the counterbalance unit may inevitably result in power loss. For example, if a weight of a car of an elevator changes significantly, many counterbalance units have to be assembled and/or dismantled which may lead to waste of time. There is, therefore, a need for an energy-saving elevator which has a simple and rational structure and is able to effectively realize elevator energy saving.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary energy-saving elevator. In an exemplary embodiment, an exemplary energy-saving elevator may include an elevator, a counterweight, a lift cable, and a hoist-type lifting mechanism. In an exemplary embodiment, the lift cable may be interconnected between the elevator car and the counterweight. In an exemplary embodiment, a first end of the lift cable may be connected to the elevator car. In an exemplary embodiment, a second end of the lift cable may be connected to the counterweight.

In an exemplary embodiment, the lift cable may be connected to the hoist-type lifting mechanism. In an exemplary embodiment, the hoist-type lifting mechanism may include a first adjustable pulley, a second adjustable pulley, and an adjusting cable. In an exemplary embodiment, the hoist-type lifting mechanism may be configured to lift the elevator car by pulling up the first end of the lift cable by rotating the first adjustable pulley in a first rotational direction.

In an exemplary embodiment, the hoist-type lifting mechanism may be configured to lift the counterweight by pulling up the second end of the lift cable by rotating the second adjustable pulley in a second rotational direction. In an exemplary embodiment, the adjusting cable may be interconnected between the first adjustable pulley and the second adjustable pulley. In an exemplary embodiment, the first adjustable pulley and the second adjustable pulley may be configured to hold the adjusting cable.

In an exemplary embodiment, the first adjustable pulley may include a first fixed conical member and a first moveable conical member. In an exemplary embodiment, the first fixed conical member may include a first conical surface. In an exemplary embodiment, the first moveable conical member may include a second conical surface.

In an exemplary embodiment, the first moveable conical member may be configured to move linearly along a first axis. In an exemplary embodiment, the first conical surface and the second conical surface may face each other. In an exemplary embodiment, the first conical surface and the second conical surface may form a first trapezoid-shape groove between the first fixed conical member and the first moveable conical member. In an exemplary embodiment, the first trapezoid-shape groove may be configured to receive the adjusting cable. In an exemplary embodiment, the first conical surface and the second conical surface may be configured to hold the adjusting cable inside the first trapezoid-shape groove.

In an exemplary embodiment, the adjusting cable may be configured to move away from the first axis inside the first trapezoid-shape groove responsive to moving the first moveable conical member towards the first fixed conical member along the first axis. In an exemplary embodiment, the adjusting cable may be configured to move towards the first axis inside the first trapezoid-shape groove responsive to moving the first moveable conical member away from the first fixed conical member along the first axis.

In an exemplary embodiment, the second adjustable pulley may include a second fixed conical member and a second moveable conical member. In an exemplary embodiment, the second fixed conical member may include a third conical surface. In an exemplary embodiment, the second moveable conical member may include a fourth conical surface.

In an exemplary embodiment, the second moveable conical member may be configured to move linearly along a second axis. In an exemplary embodiment, the third conical surface and the fourth conical surface may face each other. In an exemplary embodiment, the third conical surface and the fourth conical surface may form a second trapezoid-shape groove between the second fixed conical member and the second moveable conical member.

In an exemplary embodiment, the second trapezoid-shape groove may be configured to receive the adjusting cable. In an exemplary embodiment, the adjusting cable may be configured to move away from the second axis inside the second trapezoid-shape groove responsive to moving the second moveable conical member toward the second fixed conical member along the second axis. In an exemplary embodiment, the adjusting cable may be configured to move toward the second axis inside the second trapezoid-shape groove responsive to moving the second moveable conical member away from the second fixed conical member along the second axis.

In an exemplary embodiment, the first conical surface may be formed by revolving a first inclined line around the first axis. In an exemplary embodiment, the second conical surface may be formed by revolving a second inclined line around the first axis. In an exemplary embodiment, the third conical surface may be formed by revolving a third inclined line around the second axis. In an exemplary embodiment, the fourth conical surface may be formed by revolving a fourth inclined line around the second axis.

In an exemplary embodiment, the first conical surface may be bounded between a first smaller circle of the first fixed conical member and a first larger circle of the first fixed conical member. In an exemplary embodiment, a diameter of the first smaller circle may be smaller than a diameter of the first larger circle. In an exemplary embodiment, the second conical surface may be bounded between a second smaller circle of the first moveable conical member and a second larger circle of the first moveable conical member. In an exemplary embodiment, a diameter of the second smaller circle may be smaller than a diameter of the second larger circle.

In an exemplary embodiment, the third conical surface may be bounded between a third smaller circle of the second fixed conical member and a third larger circle of the second fixed conical member. In an exemplary embodiment, a diameter of the third smaller circle may be smaller than a diameter of the third larger circle. In an exemplary embodiment, the fourth conical surface may be bounded between a fourth smaller circle of the second moveable conical member and a fourth larger circle of the second moveable conical member. In an exemplary embodiment, a diameter of the fourth smaller circle may be smaller than a diameter of the fourth larger circle.

In an exemplary embodiment, the first fixed conical member may include a first front surface. In an exemplary embodiment, the first front surface may include a circular shape. In an exemplary embodiment, an outer circle of the first front surface may coincide with the first smaller circle. In an exemplary embodiment, the first moveable conical member may include a second front surface. In an exemplary embodiment, the second front surface may include a circular shape. In an exemplary embodiment, an outer circle of the second front surface may coincide with the second smaller circle.

In an exemplary embodiment, the second fixed conical member may include a third front surface. In an exemplary embodiment, the third front surface may include a circular shape. In an exemplary embodiment, an outer circle of the third front surface may coincide with the third smaller circle.

In an exemplary embodiment, the second moveable conical member may include a fourth front surface. In an exemplary embodiment, the fourth front surface may include a circular shape. In an exemplary embodiment, an outer circle of the fourth front surface may coincide with the fourth smaller circle. In an exemplary embodiment, the first front surface may face the second front surface. In an exemplary embodiment, the third front surface may face the fourth front surface.

In an exemplary embodiment, the energy-saving elevator may further include a first rod and a second rod. In an exemplary embodiment, a main axis of the first rod main coincide with the first axis. In an exemplary embodiment, the first fixed conical member may be mounted fixedly on the first rod. In an exemplary embodiment, the first moveable conical member may be mounted slidably on the first rod.

In an exemplary embodiment, a main axis of the second rod may coincide with the second axis. In an exemplary embodiment, the second fixed conical member may be mounted fixedly. In an exemplary embodiment, the second moveable conical member may be mounted slidably on the second rod.

In an exemplary embodiment, the energy-saving elevator may further include a first sheave and a second sheave. In an exemplary embodiment, the first sheave may be mounted on the first rod by utilizing a first idler bearing. In an exemplary embodiment, the first idler bearing may be disposed between the first sheave and the first rod. In an exemplary embodiment, the first idler bearing may be configured to urge the first sheave to rotate around the first axis synchronously with the first rod responsive to clockwise rotation of the first rod around the first axis. In an exemplary embodiment, the first rod may remain stationary responsive to counterclockwise rotation of the first rod around the first axis.

In an exemplary embodiment, the second sheave may be mounted on the second rod by utilizing a second idler bearing. In an exemplary embodiment, the second idler bearing may be disposed between the second sheave and the second rod. In an exemplary embodiment, the second idler bearing may be configured to urge the second sheave to rotate around the second axis synchronously with the second rod responsive to counterclockwise rotation of the second rod around the second axis. In an exemplary embodiment, the second rod may remain stationary responsive to clockwise rotation of the second sheave around the second axis. In an exemplary embodiment, the first sheave and the second sheave may be configured to hold the lift cable. In an exemplary embodiment, the lift cable may be wrapped around the first sheave and the second sheave.

In an exemplary embodiment, the energy-saving elevator may include a first actuator and a second actuator. In an exemplary embodiment, the first actuator may be attached to the first moveable conical member. In an exemplary embodiment, the first actuator may be configured to move the first moveable conical member along the first axis. In an exemplary embodiment, the second actuator may be attached to the second moveable conical member. In an exemplary embodiment, the second actuator may be configured to move the second moveable conical member along the second axis.

In an exemplary embodiment, the first adjustable pulley may be configured to rotate around the first axis. In an exemplary embodiment, the second adjustable pulley may be configured to rotate around the second axis. In an exemplary embodiment, the first axis may be parallel to the second axis. In an exemplary embodiment, the energy-saving elevator may further include an electromotor. In an exemplary embodiment, the electromotor may be configured to rotate the first adjustable pulley around the first axis and rotate the second adjustable pulley around the second axis.

In an exemplary embodiment, the electromotor may include a drive gear. In an exemplary embodiment, the drive gear configured to move along a third axis, the third axis parallel to the first axis and the second axis.

In an exemplary embodiment, the energy-saving elevator may further include a first gear and a second gear. In an exemplary embodiment, the first gear may be connected to the first adjustable pulley. In an exemplary embodiment, the electromotor may be configured to be engaged with the first gear responsive to the drive gear being in a first position along the third axis. In an exemplary embodiment, the second gear may be connected to the second adjustable pulley. In an exemplary embodiment, the electromotor may be configured to be engaged with the second gear responsive to the drive gear being in a second position along the third axis.

In an exemplary embodiment, the electromotor may be configured to rotate the first adjustable pulley around the first axis responsive to the electromotor being engaged with the first gear. In an exemplary embodiment, the electromotor may be configured to rotate the second adjustable pulley around the second axis responsive to the electromotor being engaged with the second gear.

In an exemplary embodiment, the energy-saving elevator may further include a first weight sensor and a second weight sensor. In an exemplary embodiment, the first weight sensor may be associated with the elevator car. In an exemplary embodiment, the first weight sensor may be configured to measure a weight of the elevator car. In an exemplary embodiment, the second weight sensor may be associated with the counterweight. In an exemplary embodiment, the second weight sensor may be configured to measure a weight of the counterweight.

In an exemplary embodiment, the energy-saving elevator may further include one or more processors. In an exemplary embodiment, the one or more processors may be configured to receive a first set of data associated with the weight of the elevator car from the first weight sensor, receive a second set of data associated with the weight of the counterweight from the second weight sensor, control the first actuator and the second actuator based on the first set of data and the second set of data, and control a position of the electromotor along the third axis based on the first set of data and the second set of data.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
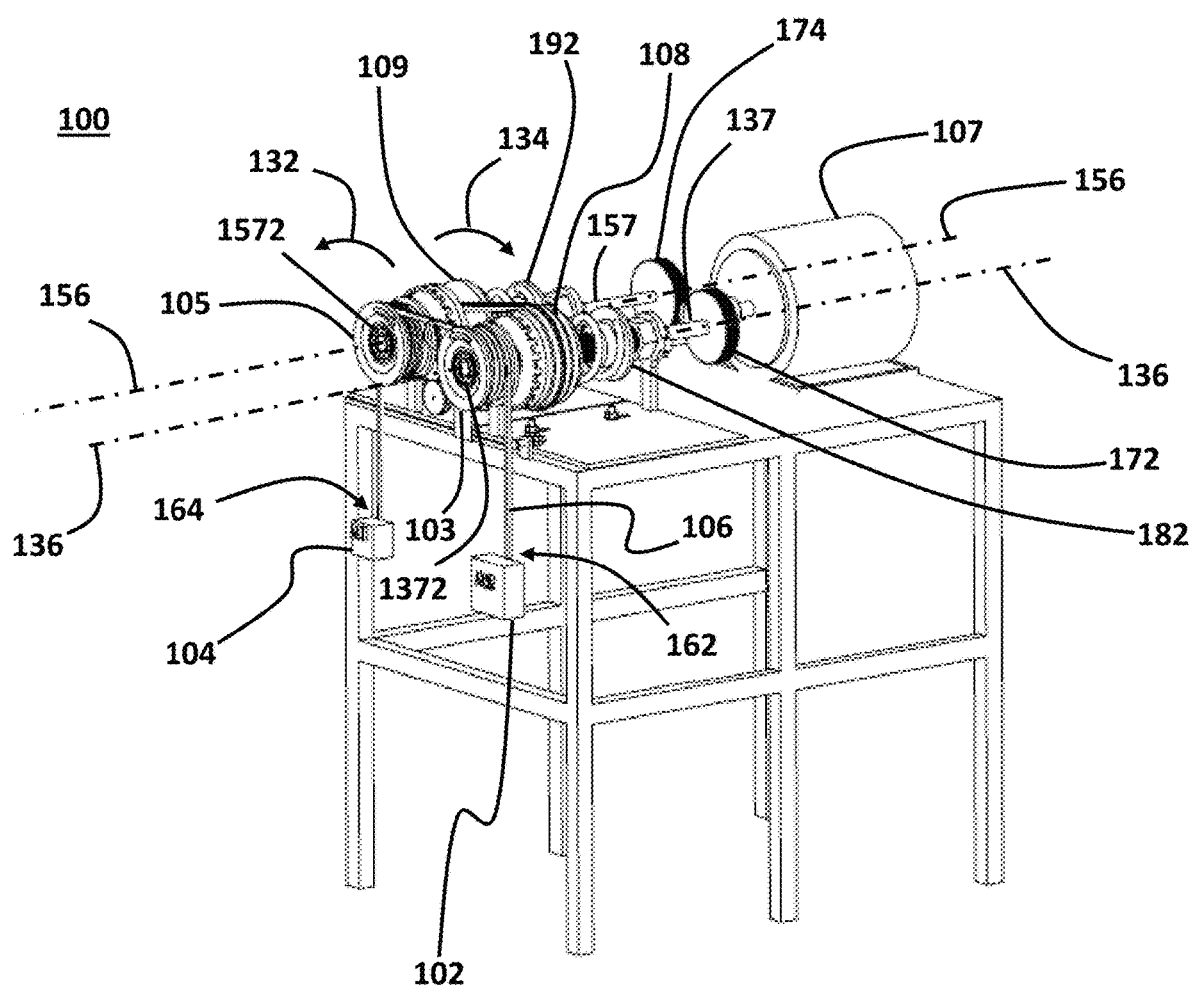
FIG. 1A illustrates a perspective view of an exemplary energy-saving elevator, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary energy-saving elevator. An exemplary energy-saving elevator may include an elevator car with a first adjustable pulley, a counterweight with a second adjustable pulley, and an electromotor. The electromotor may rotate the first adjustable pulley and/or the second adjustable pulley to raise and/or lower the elevator car and the counterweight. The first adjustable pulley may include a first moveable conical member and a first fixed conical member which may form a first trapezoid-shaped groove between the first moveable conical member and the first fixed conical member. The second adjustable pulley may include a second moveable conical member and a second fixed conical member which may form a second trapezoid-shaped groove between the second moveable conical member and the second fixed conical member. The first adjustable pulley and the second adjustable pulley may hold an adjustable cable in the first trapezoid-shaped groove and the second trapezoid-shaped groove.

By moving the first moveable conical member toward or away from the first fixed conical member, a rotation radius of the adjustable cable inside the first trapezoid-shaped groove may increase or decrease. Also, by moving the second moveable conical member toward or away from the second fixed conical member, a rotation radius of the adjustable cable inside the second trapezoid-shaped groove may increase or decrease. Depending on a weight of the elevator car and a weight of the counterweight, a user may adjust a rotation radius of the adjustable cable inside the first trapezoid-shaped groove and a rotation radius of the adjustable cable inside the second trapezoid-shaped groove to reduce the energy consumption by the electromotor to raise and/or lower the elevator car. A user may adjust a rotation radius of the adjustable cable inside the first trapezoid-shaped groove by moving the first moveable conical member toward or away from the first fixed conical member. A user may also adjust a rotation radius of the adjustable cable inside the second trapezoid-shaped groove by moving the second moveable conical member toward or away from the second fixed conical member.

Figure 1B:
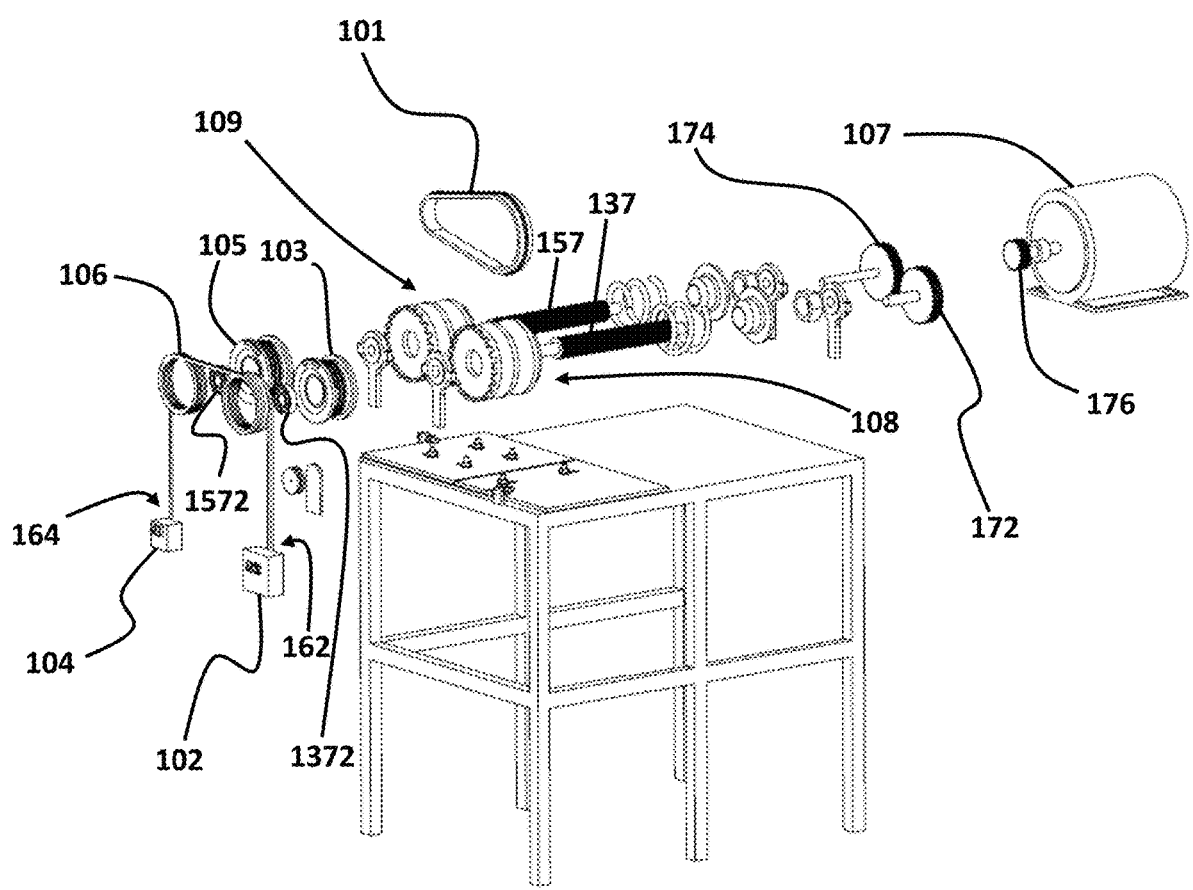
FIG. 1B illustrates an exploded view of an energy-saving elevator, consistent with one or more exemplary embodiments of the present disclosure.

FIG. 1A shows a perspective view of an exemplary energy-saving elevator 100, consistent with one or more exemplary embodiments of the present disclosure. FIG. 1B shows an exploded view of energy-saving elevator 100, consistent with one or more exemplary embodiments of the present disclosure. As shown in FIG. 1A and FIG. 1B, in an exemplary embodiment, energy-saving elevator 100 may include an elevator car 102 and a counterweight 104. In an exemplary embodiment, elevator car 102 and counterweight 104 may be connected to each other by utilizing a lift cable 106. In an exemplary embodiment, a first end 162 of lift cable 106 may be attached to elevator car 102. In an exemplary embodiment, a second end 164 of lift cable 106 may be attached to elevator car 102. In an exemplary embodiment, energy-saving elevator 100 may further include a first sheave 103 and a second sheave 105. In an exemplary embodiment, first sheave 103 and second sheave 105 may hold lift cable 106. In an exemplary embodiment, first sheave 103 may be mounted on a first rod 137. In an exemplary embodiment, first sheave 103 may be configured to rotate around a first axis 136. In an exemplary embodiment, first sheave 103 may be mounted on first rod 137. In an exemplary embodiment, first sheave 103 may be mounted on first rod 137 by utilizing a first idler bearing 1372. In an exemplary embodiment, first idler bearing 1372 may be disposed between first sheave 103 and first rod 137. In an exemplary embodiment, when first rod 137 rotates around first axis 136 in a clockwise direction, first idler bearing 1372 may urge first sheave 103 to rotate synchronously with first rod 137 around first axis 136. In an exemplary embodiment, synchronous rotation of a first element with a second element, may refer to a rotation of the first element with a same rotational speed and in a same direction as a rotation of the second element. In an exemplary embodiment, when first sheave 103 rotates around first axis 136 in a counterclockwise direction, first idler bearing 1372 may not urge first rod 137 to rotate. In an exemplary embodiment, second sheave 105 may be mounted on a second rod 157. In an exemplary embodiment, second sheave 105 may be configured to rotate around a second axis 156. In an exemplary embodiment, second sheave 105 may be mounted on second rod 157. In an exemplary embodiment, second sheave 105 may be mounted on second rod 157 by utilizing a second idler bearing 1572. In an exemplary embodiment, second idler bearing 1572 may be disposed between second sheave 105 and second rod 157. In an exemplary embodiment, when second rod 157 rotates around second axis 156 in a counterclockwise direction, second idler bearing 1572 may urge second sheave 105 to rotate synchronously with second rod 157 around second axis 136. In an exemplary embodiment, when second sheave 105 rotates around second axis 156 in a clockwise direction, second idler bearing 1572 may not urge second rod 157 to rotate. In an exemplary embodiment, first axis 136 and second axis 156 may be parallel to each other. In an exemplary embodiment, lift cable 106 may be wound around first sheave 103 and second sheave 105. In an exemplary embodiment, when first sheave 103 and second sheave 105 rotate, friction forces between a grooved surface of first sheave 103 and lift cable 106 and also friction forces between a grooved surface of second sheave 105 and lift cable 106 may move lift cable 106 and, thereby, may cause elevator car 102 and counterweight 104 to raise and/or lower in opposite directions. In an exemplary embodiment, when first sheave 103 and second sheave 105 rotate in a first rotational direction 132, elevator car 102 may be raised and counterweight 104 may be lowered. In an exemplary embodiment, when first sheave 103 and second sheave 105 rotate in a second rotational direction 134, elevator car 102 may be lowered and counterweight 104 may be raised. In an exemplary embodiment, first rotational direction 132 may refer to a counterclockwise direction and second rotational direction 134 may refer to a clockwise direction.

In an exemplary embodiment, energy-saving elevator 100 may further include an electromotor 107. In an exemplary embodiment, electromotor 107 may be configured to be connected to first sheave 103 and/or second sheave 105. In an exemplary embodiment, electromotor 107 may cause first sheave 103 to rotate around first axis 136. In an exemplary embodiment, electromotor 107 may cause second sheave 105 to rotate around second axis 156. In an exemplary embodiment, when elevator car 102 is intended to be raised, electromotor 107 may cause first sheave 103 to rotate around first axis 136 in first rotational direction 132 and cause second sheave 105 to rotate around second axis 156 in first rotational direction 132. In an exemplary embodiment, when elevator car 102 is intended to be lowered, electromotor 107 may cause first sheave 103 to rotate around first axis 136 in second rotational direction 134 and cause second sheave 105 to rotate around second axis 156 in second rotational direction 132. In an exemplary embodiment, elevator car 102 may refer to a compartment which may be configured to carry people and/or freight from floor to floor in a building. It also may be understood that a total weight of elevator car 102 may depend on people and/or freight that elevator car 102 carries.

Figure 2A:
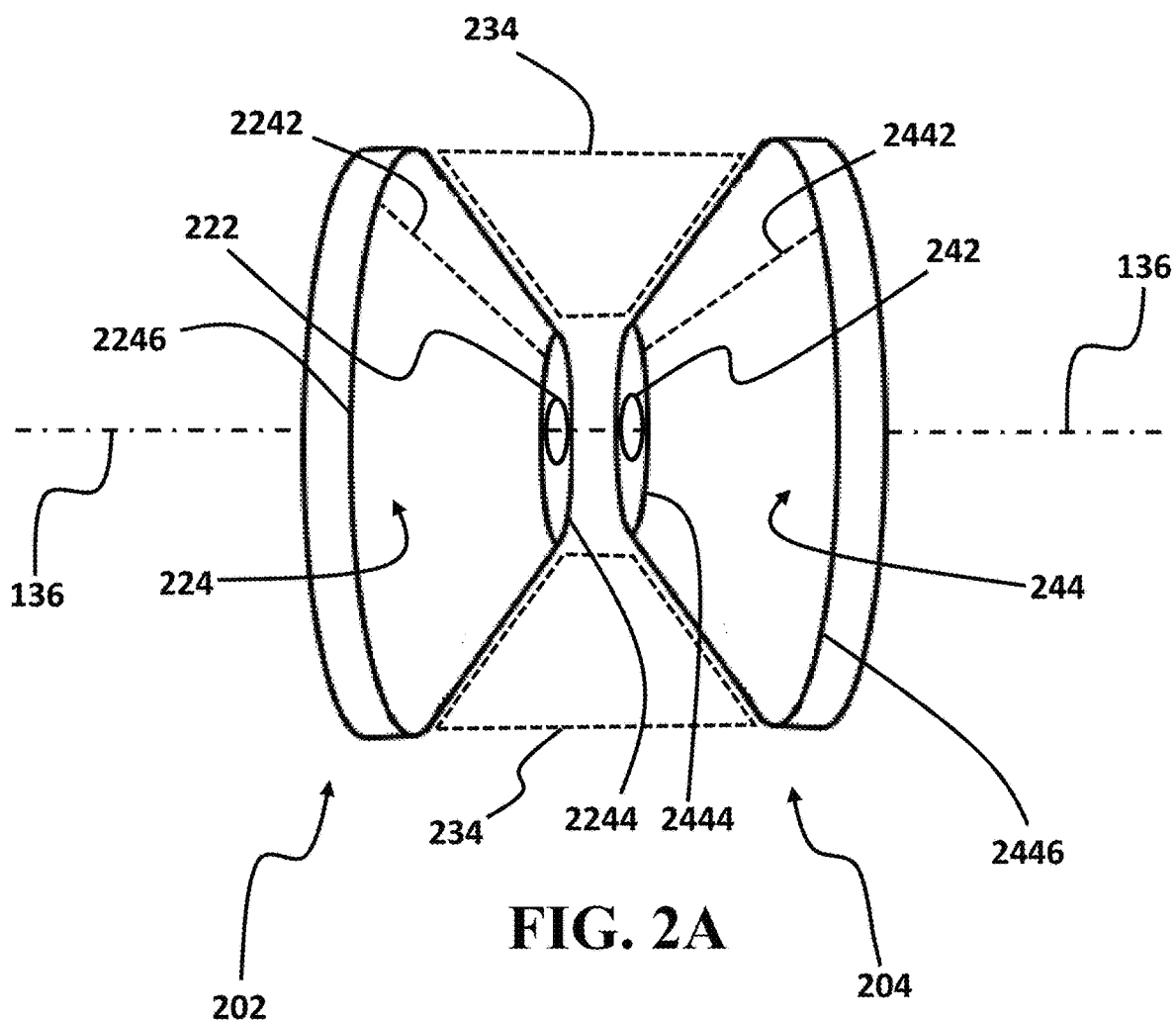
FIG. 2A illustrates a first adjustable pulley, consistent with one or more exemplary embodiments of the present disclosure.
Figure 2B:
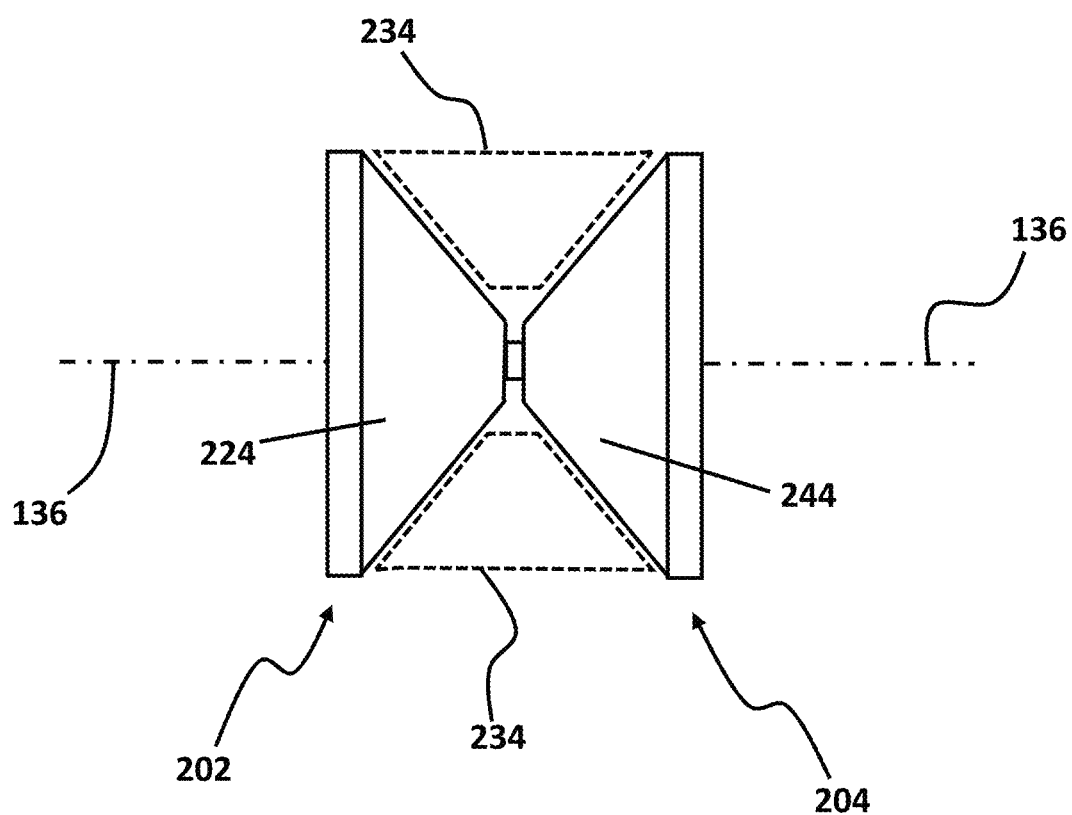
FIG. 2B illustrates a side view of a first adjustable pulley, consistent with one or more exemplary embodiments of the present disclosure.

In an exemplary embodiment, energy-saving elevator 100 may further include a first adjustable pulley 108 and a second adjustable pulley 109. FIG. 2A shows first adjustable pulley 108, consistent with one or more exemplary embodiments of the present disclosure. FIG. 2B shows a side view of first adjustable pulley 108, consistent with one or more exemplary embodiments of the present disclosure. As shown in FIG. 2A and FIG. 2B, in an exemplary embodiment, first adjustable pulley 108 may include a first fixed conical member 202 and a first moveable conical member 204. In an exemplary embodiment, first fixed conical member 202 may be mounted fixedly on first rod 137. In an exemplary embodiment, when first fixed conical member 202 is mounted fixedly on first rod 137, it may mean that first fixed conical member 202 is mounted on first rod 137 in such a way that any relative movement between first fixed conical member 202 and first rod 137 may be prevented. In an exemplary embodiment, first fixed conical member 202 may include a first rod receiving hole 222. In an exemplary embodiment, in order to mount first fixed conical member 202 on first rod 137, first rod 137 may be inserted into first rod receiving hole 222. In an exemplary embodiment, first rod 137 may be tightly fitted inside first rod receiving hole 222 to prevent any relative movement between first fixed conical member 202 and first rod 137.

In an exemplary embodiment, first moveable conical member 204 may be mounted slidably on first rod 137. In an exemplary embodiment, when first moveable conical member 204 is mounted slidably on first rod 137, it may mean that first moveable conical member 204 is mounted on first rod 137 in such a way that first moveable conical member 204 may be able to move linearly along first axis 136. In an exemplary embodiment, first moveable conical member 204 may include a second rod receiving hole 242. In an exemplary embodiment, in order to mount first moveable conical member 204 on first rod 137, first rod 137 may be inserted into second rod receiving hole 242. In an exemplary embodiment, first rod 137 may be loosely fitted inside second rod receiving hole 242 to allow linear movement of first moveable conical member 204 along first axis 136. In an exemplary embodiment, an inner diameter of second rod receiving hole 242 may be slightly larger than an outer diameter of first rod 137. For example, the inner diameter of second rod receiving hole 242 may be larger than the outer diameter of first rod 137 by the amount of 1 mm.

In an exemplary embodiment, first fixed conical member 202 may include a first conical surface 224. In an exemplary embodiment, first conical surface 224 may be formed by revolving a first inclined line 2242 around first axis 136. In an exemplary embodiment, first conical surface 224 may be bounded between a first smaller circle 2244 and a first larger circle 2246. In an exemplary embodiment, a diameter of first smaller circle 2244 may be smaller than a diameter of first larger circle 2246. In an exemplary embodiment, first moveable conical member 204 may include a second conical surface 244. In an exemplary embodiment, second conical surface 244 may be formed by revolving a second inclined line 2442 around first axis 136. In an exemplary embodiment, second conical surface 244 may be bounded between a second smaller circle 2444 and a second larger circle 2446. In an exemplary embodiment, a diameter of second smaller circle 2444 may be smaller than a diameter of second larger circle 2446. In an exemplary embodiment, first fixed conical member 202 and first moveable conical member 204 may be mounted on first rod 137 in such a way that first conical surface 224 and second conical surface 244 face each other. In an exemplary embodiment, first conical surface 224 and second conical surface 244 may form a first trapezoid-shape groove 234 between first fixed conical member 202 and first moveable conical member 204. In an exemplary embodiment, first trapezoid-shape groove 234 may be configured to receive an adjusting cable 101. In an exemplary embodiment, receiving adjusting cable 101 by first trapezoid-shape groove 234 may refer to inserting adjusting cable 101 into first trapezoid-shape groove 234. In an exemplary embodiment, adjusting cable 101 may be disposed inside first trapezoid-shape groove 234. In an exemplary embodiment, adjusting cable 101 may be inserted into first trapezoid-shape groove 234. In an exemplary embodiment, first conical surface 224 and second conical surface 244 may hold adjusting cable 101 inside first trapezoid-shape groove 234.

Figure 3A:
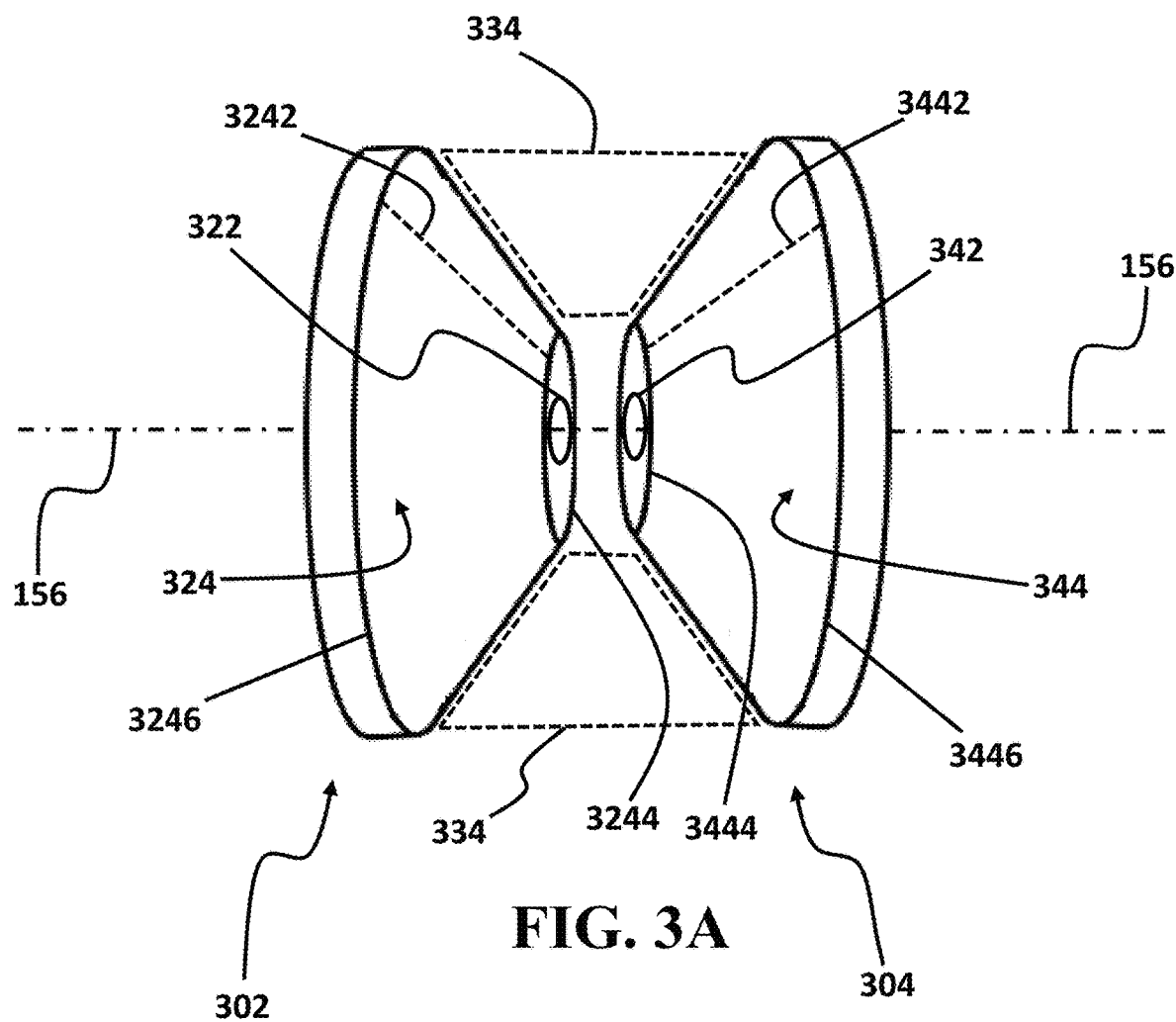
FIG. 3A illustrates a second adjustable pulley, consistent with one or more exemplary embodiments of the present disclosure.
Figure 3B:
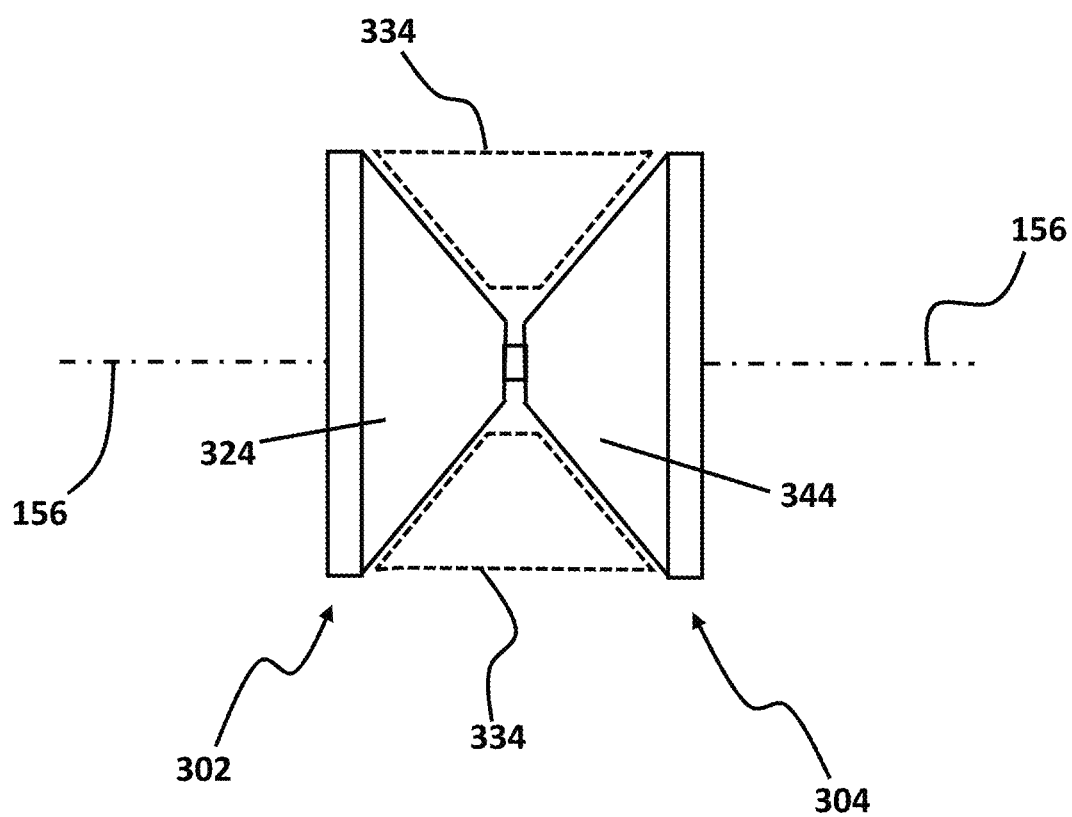
FIG. 3B illustrates a side view of a second adjustable pulley, consistent with one or more exemplary embodiments of the present disclosure.

FIG. 3A shows second adjustable pulley 109, consistent with one or more exemplary embodiments of the present disclosure. FIG. 3B shows a side view of second adjustable pulley 109, consistent with one or more exemplary embodiments of the present disclosure. In an exemplary embodiment, first adjustable pulley 108 and second adjustable pulley 109 may be coupled to each other by utilizing adjusting cable 101. In an exemplary embodiment, second adjustable pulley 109 may be substantially similar to first adjustable pulley 108 in structure and function. As shown in FIG. 3A and FIG. 3B, in an exemplary embodiment, second adjustable pulley 109 may include a second fixed conical member 302 and a second moveable conical member 304. In an exemplary embodiment, second fixed conical member 302 may be mounted fixedly on second rod 157. In an exemplary embodiment, when second fixed conical member 302 is mounted fixedly on second rod 157, it may mean that second fixed conical member 302 is mounted on second rod 157 in such a way that any relative movement between second fixed conical member 302 and second rod 157 may be prevented. In an exemplary embodiment, second fixed conical member 302 may include a third rod receiving hole 322. In an exemplary embodiment, in order to mount second fixed conical member 302 on second rod 157, second rod 157 may be inserted into third rod receiving hole 322. In an exemplary embodiment, second rod 157 may be tightly fitted inside third rod receiving hole 322 to prevent any relative movement between second fixed conical member 302 and second rod 157.

In an exemplary embodiment, second moveable conical member 304 may be mounted slidably on second rod 157. In an exemplary embodiment, when second moveable conical member 304 is mounted slidably on second rod 157, it may mean that second moveable conical member 304 is mounted on second rod 157 in such a way that second moveable conical member 304 may be able to move linearly along second axis 156. In an exemplary embodiment, second moveable conical member 304 may include a fourth rod receiving hole 342. In an exemplary embodiment, in order to mount second moveable conical member 304 on second rod 157, second rod 157 may be inserted into fourth rod receiving hole 342. In an exemplary embodiment, second rod 157 may be loosely fitted inside fourth rod receiving hole 342 to allow linear movement of second moveable conical member 304 along second axis 156. In an exemplary embodiment, an inner diameter of fourth rod receiving hole 342 may be slightly larger than an outer diameter of second rod 157. For example, the inner diameter of fourth rod receiving hole 342 may be larger than the outer diameter of second rod 157 by the amount of 1 mm.

In an exemplary embodiment, second fixed conical member 302 may include a third conical surface 324. In an exemplary embodiment, third conical surface 324 may be formed by revolving a third inclined line 3242 around second axis 156. In an exemplary embodiment, third conical surface 324 may be bounded between a third smaller circle 3244 and a third larger circle 3246. In an exemplary embodiment, a diameter of third smaller circle 3244 may be smaller than a diameter of third larger circle 3246. In an exemplary embodiment, second moveable conical member 304 may include a fourth conical surface 344. In an exemplary embodiment, fourth conical surface 344 may be formed by revolving a fourth inclined line 3442 around second axis 156. In an exemplary embodiment, fourth conical surface 344 may be bounded between a fourth smaller circle 3444 and a fourth larger circle 3446. In an exemplary embodiment, a diameter of fourth smaller circle 3444 may be smaller than a diameter of fourth larger circle 3446. In an exemplary embodiment, second fixed conical member 302 and second moveable conical member 304 may be mounted on second rod 157 in such a way that third conical surface 324 and fourth conical surface 344 face each other. In an exemplary embodiment, third conical surface 324 and fourth conical surface 344 may form a second trapezoid-shape groove 334 between second fixed conical member 302 and second moveable conical member 304. In an exemplary embodiment, second trapezoid-shape groove 334 may be configured to receive adjusting cable 101. In an exemplary embodiment, receiving adjusting cable 101 by second trapezoid-shape groove 334 may refer to inserting adjusting cable 101 into second trapezoid-shape groove 334. In an exemplary embodiment, adjusting cable 101 may be disposed inside second trapezoid-shape groove 334. In an exemplary embodiment, adjusting cable 101 may be inserted into second trapezoid-shape groove 334. In an exemplary embodiment, third conical surface 324 and fourth conical surface 344 may hold adjusting cable 101 inside second trapezoid-shape groove 334.

Figure 3C:
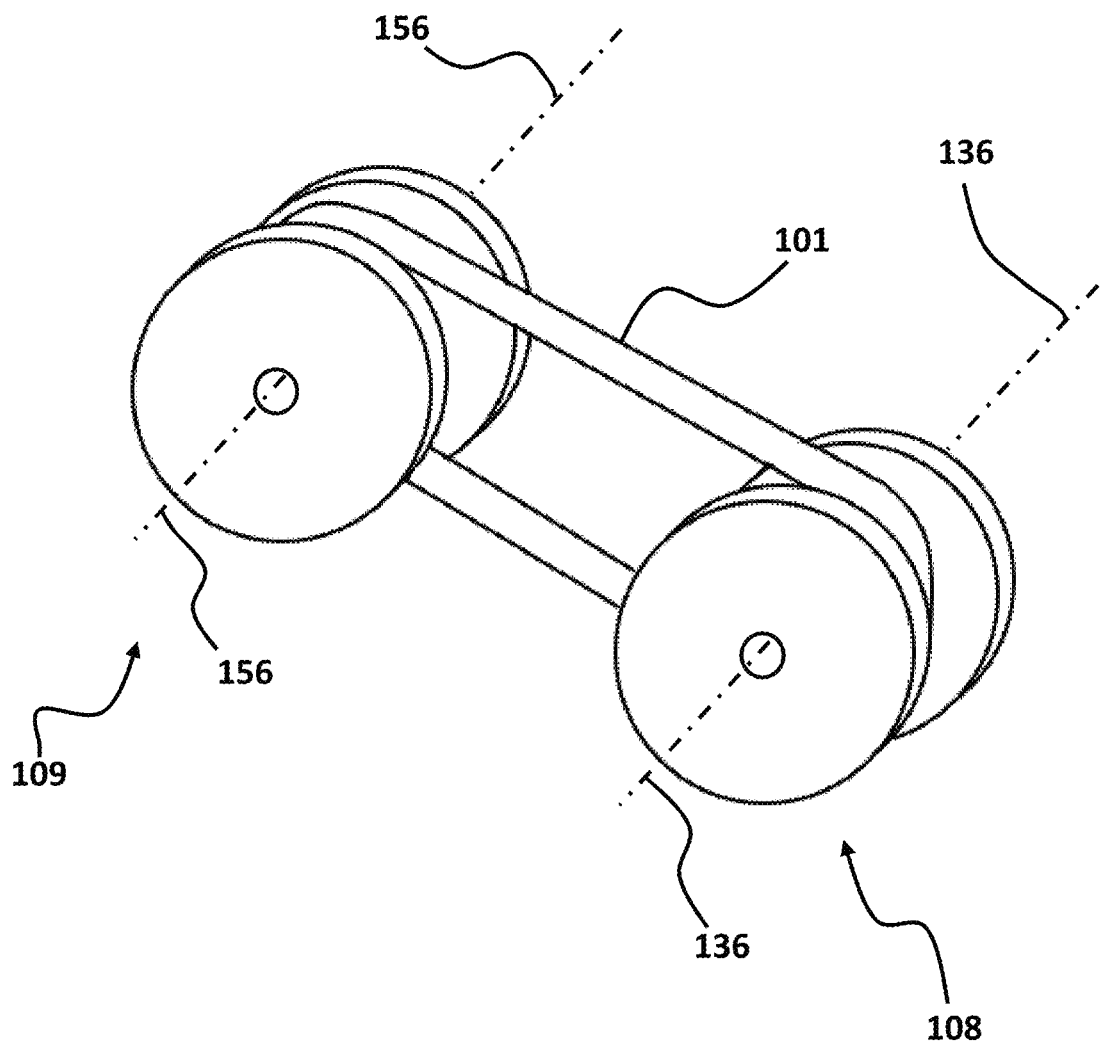
FIG. 3C illustrates a perspective view of a first sheave and a second sheave when an adjustable cable is inserted into a first trapezoid-shape groove and a second trapezoid-shape groove, consistent with one or more exemplary embodiments of the present disclosure.

FIG. 3C shows a perspective view of first sheave 103 and second sheave 105 when adjustable cable 101 is inserted into first trapezoid-shape groove 234 and second trapezoid-shape groove 334, consistent with one or more exemplary embodiments of the present disclosure. Referring to FIG. 2B, in an exemplary embodiment, when first moveable conical member 204 moves away from first fixed conical member 202 and along first axis 136, adjustable cable 101 may move toward first axis 136 inside first trapezoid-shape groove 234. In an exemplary embodiment, it may be understood that when first moveable conical member 204 moves away from first fixed conical member 202, first conical surface 224 and second conical surface 244 may become further from each other and, to thereby, may urge adjustable cable 101 to move toward first axis 136 inside first trapezoid-shape groove 234. In an exemplary embodiment, when first moveable conical member 204 moves toward first fixed conical member 202 and along first axis 136, adjustable cable 101 may move away from first axis 136 inside first trapezoid-shape groove 234. In an exemplary embodiment, it may be understood that when first moveable conical member 204 moves toward first fixed conical member 202, first conical surface 224 and second conical surface 244 may become closer to each other and, to thereby, may urge adjustable cable 101 to move away from first axis 136 inside first trapezoid-shape groove 234.

Referring to FIG. 3B, in an exemplary embodiment, when second moveable conical member 304 moves away from second fixed conical member 302 and along second axis 156, adjustable cable 101 may move toward second axis 156 inside second trapezoid-shape groove 334. In an exemplary embodiment, it may be understood that when second moveable conical member 304 moves away from second fixed conical member 302, third conical surface 324 and fourth conical surface 344 may become closer to each other and, to thereby, may urge adjustable cable 101 to move toward second axis 156 inside second trapezoid-shape groove 334. In an exemplary embodiment, when second moveable conical member 304 moves toward second fixed conical member 302 and along second axis 156, adjustable cable 101 may move away from second axis 156 inside second trapezoid-shape groove 334. In an exemplary embodiment, it may be understood that when second moveable conical member 304 moves toward second fixed conical member 302, third conical surface 324 and fourth conical surface 344 may become closer to each other and, to thereby, may urge adjustable cable 101 to move away from second axis 156 inside second trapezoid-shape groove 334.

Figure 3D:
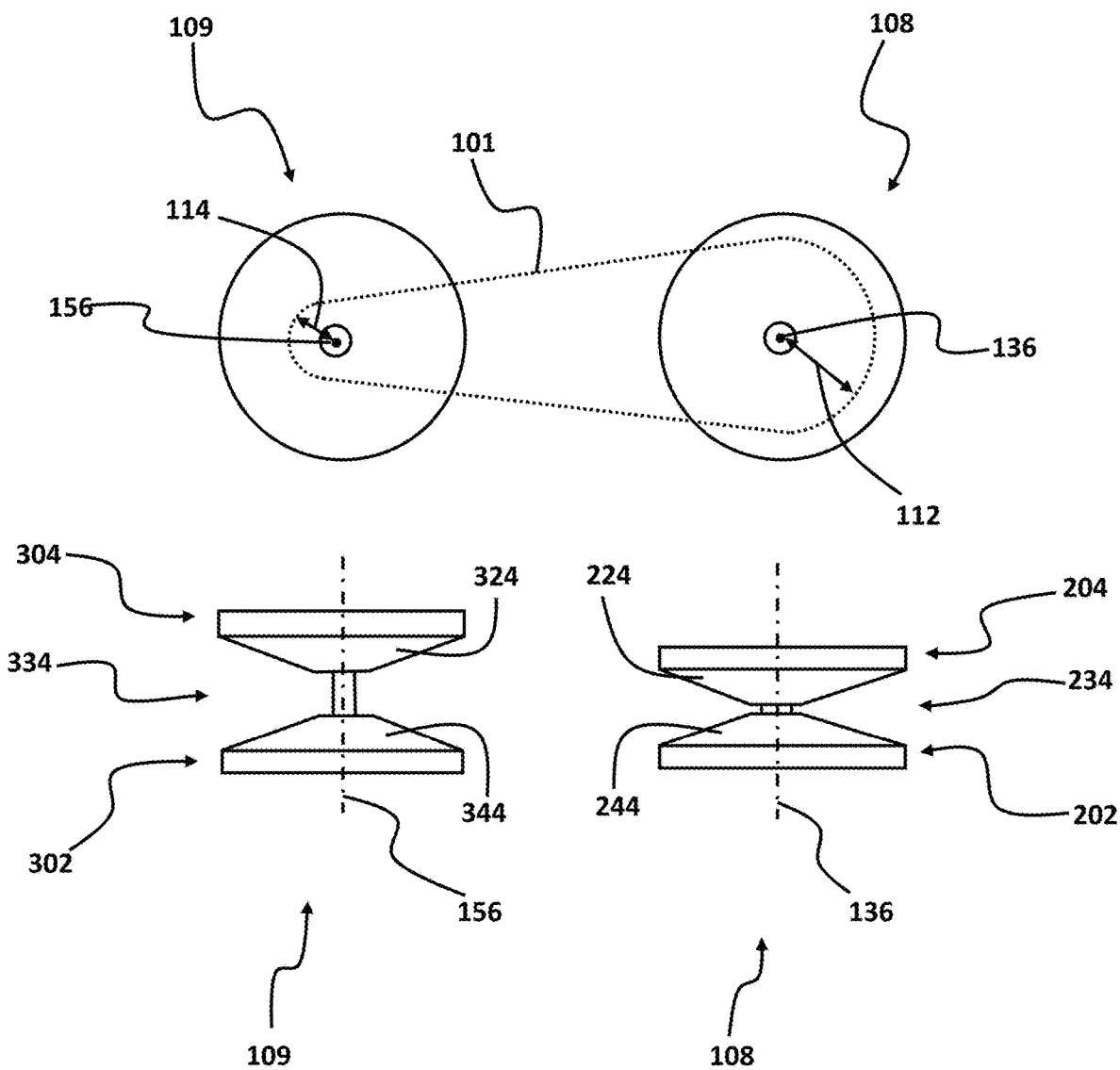
FIG. 3D illustrates a side view and a top view of a first sheave, a second sheave, and an adjustable cable in a first scenario in which a first moveable conical member is close to a first fixed conical member and a second moveable conical member is far from a second fixed conical member, consistent with one or more exemplary embodiments of the present disclosure.
Figure 3E:
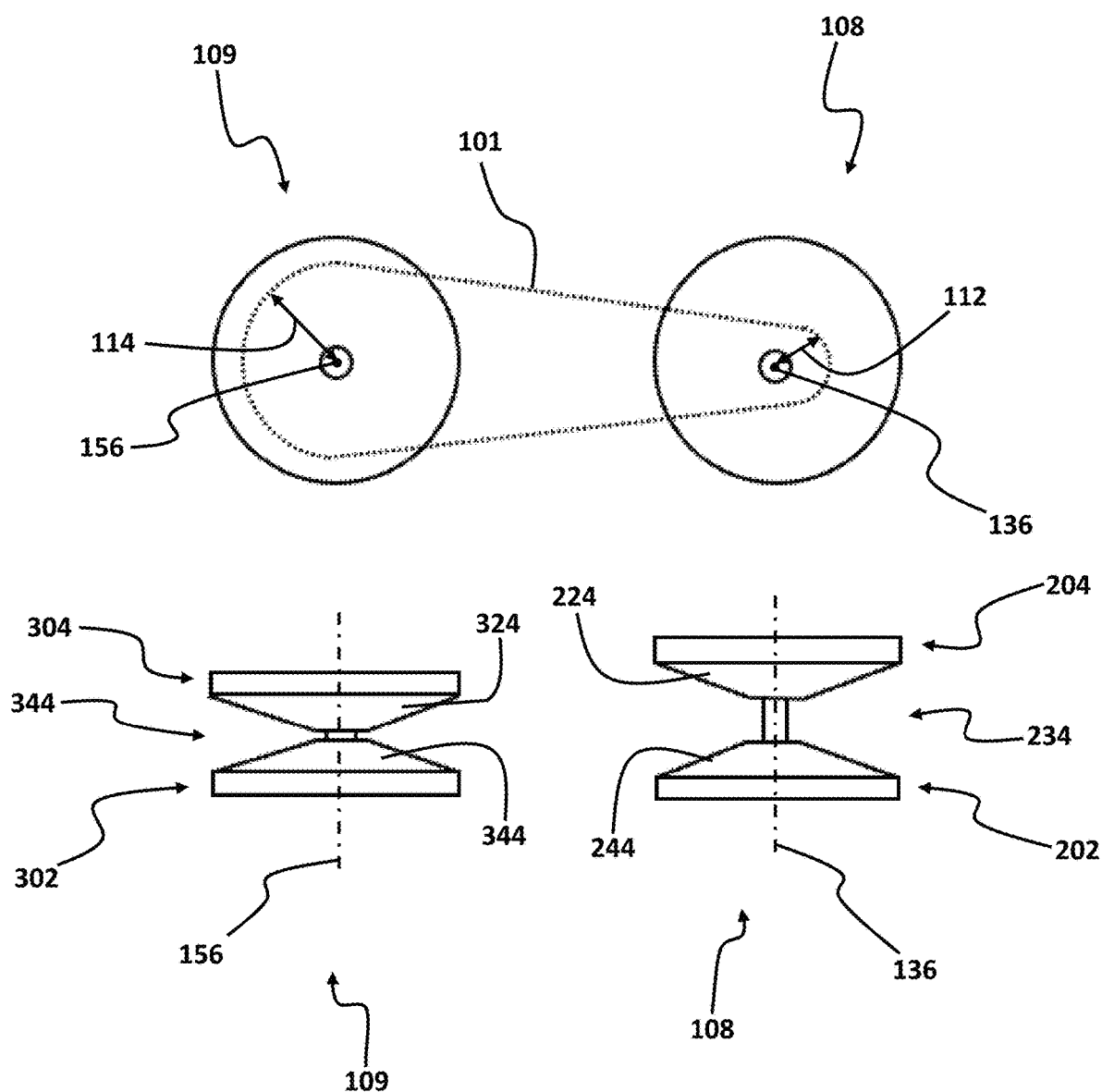
FIG. 3E shows a side view and a top view of first sheave, second sheave, and adjustable cable in a second scenario in which first moveable conical member is relatively far from first fixed conical member and second moveable conical member is relatively close to second fixed conical member, consistent with one or more exemplary embodiments.

FIG. 3D shows a side view and a top view of first sheave 103, second sheave 105, and adjustable cable 101 in a first scenario in which first moveable conical member 204 is relatively close to first fixed conical member 202 and second moveable conical member 304 is relatively far from second fixed conical member 302, consistent with one or more exemplary embodiments of the present disclosure. In an exemplary embodiment, first radius 112 may depend on closeness of first moveable conical member 204 to first fixed conical member 202. In an exemplary embodiment, first radius 112 may refer to a distance between first axis 136 and adjustable cable 101 as shown in FIG. 3D. In an exemplary embodiment, second radius 114 may depend on closeness of second moveable conical member 304 and second fixed conical member 302. In an exemplary embodiment, second radius 114 may refer to a distance between second axis 156 and adjustable cable 101 as shown in FIG. 3D. In an exemplary embodiment, in the first scenario, first radius 112 may be greater than second radius 114. FIG. 3E shows a side view and a top view of first sheave 103, second sheave 105, and adjustable cable 101 in a second scenario in which first moveable conical member 204 is relatively far from first fixed conical member 202 and second moveable conical member 304 is relatively close to second fixed conical member 302. In an exemplary embodiment, in the second scenario, second radius 114 may be greater than first radius 112.

As further shown in FIG. 1A and FIG. 1B, in an exemplary embodiment, energy-saving elevator 100 may further include a first actuator 182 and a second actuator 192. In an exemplary embodiment, first actuator 182 may be attached to first moveable conical member 204. In an exemplary embodiment, first actuator 182 may be configured to move first moveable conical member 204 along first axis 136. In an exemplary embodiment, first actuator 182 may move first moveable conical member 204 along first axis 136 to increase and/or decrease a distance between first moveable conical member 204 and first fixed conical member 202. In an exemplary embodiment, first actuator 182 may decrease a distance between first moveable conical member 204 and first fixed conical member 202 by moving first moveable conical member 204 along first axis 136 and in a first direction. In an exemplary embodiment, first actuator 182 may increase a distance between first moveable conical member 204 and first fixed conical member 202 by moving first moveable conical member 204 along first axis 136 and in a second direction. In an exemplary embodiment, second actuator 192 may be attached to second moveable conical member 304. In an exemplary embodiment, second actuator 192 may be configured to move second moveable conical member 304 along second axis 156. In an exemplary embodiment, second actuator 192 may move second moveable conical member 304 along second axis 156 to increase and/or decrease a distance between second moveable conical member 304 and second fixed conical member 302. In an exemplary embodiment, second actuator 192 may decrease a distance between second moveable conical member 304 and second fixed conical member 302 by moving second moveable conical member 304 along second axis 156 and in a first direction. In an exemplary embodiment, second actuator 192 may increase a distance between second moveable conical member 304 and second fixed conical member 302 by moving second moveable conical member 304 along second axis 156 and in a second direction.

As further shown in FIG. 1A and FIG. 1B, in an exemplary embodiment, energy-saving elevator 100 may further include a first gear 172 and a second gear 174. In an exemplary embodiment, first gear 172 may be connected to first adjustable pulley 108 through first rod 137. In an exemplary embodiment, second gear 174 may be connected to second adjustable pulley 109 through second rod 157. In an exemplary embodiment, electromotor 107 may be configured to be connected to first gear 172 and/or second gear 174. In an exemplary embodiment, electromotor 107 may include a drive gear 176 which may be configured to be engaged with first gear 172 and/or second gear 174.

Figure 4A:
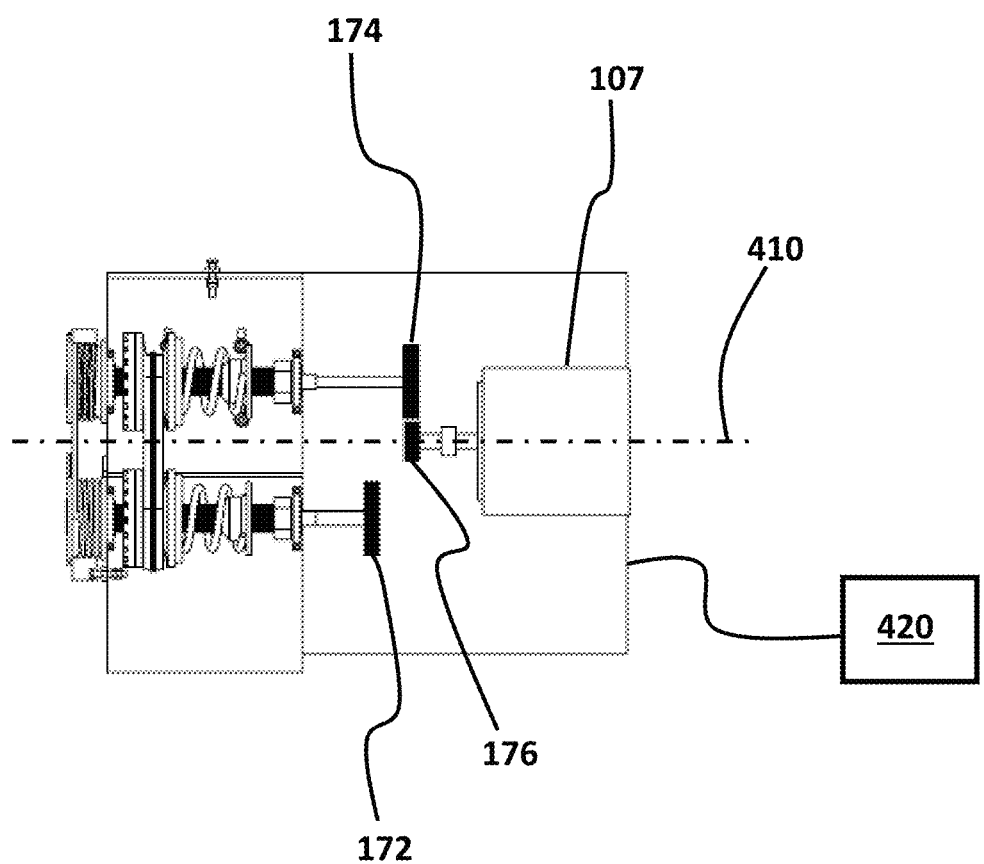
FIG. 4A illustrates a top view of an energy-saving elevator, consistent with one or more exemplary embodiments of the present disclosure.

FIG. 4A shows a top view of energy-saving elevator 100, consistent with one or more exemplary embodiments of the present disclosure. In an exemplary embodiment, drive gear 176 may be configured to be moveable along a third axis 410. In an exemplary embodiment, drive gear 176 may be connected to a motor that may move drive gear 176 along third axis 410.

Figure 4B:
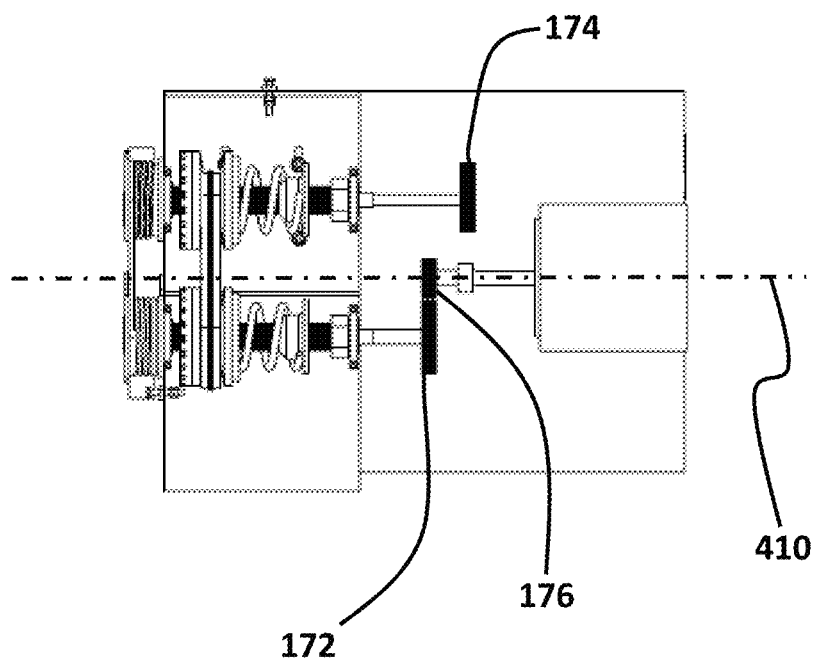
FIG. 4B illustrates a top view of an energy-saving elevator in a scenario in which a drive gear is engaged with a first gear, consistent with one or more exemplary embodiments of the present disclosure.

In an exemplary embodiment, when drive gear 176 is engaged with first gear 172, electromotor 107 may rotate first adjustable pulley 108. FIG. 4B shows a top view of energy-saving elevator 100 in a scenario in which drive gear 176 is engaged with first gear 172, consistent with one or more exemplary embodiments of the present disclosure. In an exemplary embodiment, when drive gear 176 is engaged with second gear 174 (as shown in FIG. 4A), electromotor 107 may rotate second adjustable pulley 109.

In an exemplary embodiment, energy-saving elevator 100 may include a first weight sensor and a second weight sensor (not shown in Figures). In an exemplary embodiment, the first weight sensor may be configured to measure a weight of car elevator 102. In an exemplary embodiment, the second weight sensor may be configured to measure a weight of counterweight 104. In an exemplary embodiment, the first weight sensor and the second weight sensor may include a dynamometer or a load cell. In an exemplary embodiment, energy-saving elevator 100 may further include a processor 420. In an exemplary embodiment, processor 420 may receive a first set of data associated with the weight of elevator car 102 from the first weight sensor and receive a second set of data associated with the weight of counterweight 104 from the second weight sensor. In an exemplary embodiment, processor 420 may be configured to control movements of first actuator 182, second actuator 192, and drive gear 176. For example, when elevator car 102 is heavier than counterweight 104 and elevator car 102 is intended to be raised, first actuator 182 may move first moveable conical member 204 along first axis 136 and toward first fixed conical member 202 so that first radius 112 may be increased. Furthermore, second actuator 192 may move second moveable conical member 304 along second axis 156 and away from second fixed conical member 302 so that second radius 114 may be decreased. Additionally, drive gear 176 may be moved to be engaged with first gear 172. Then, first gear 172 may be rotated in first rotational direction 132 to raise elevator car 102.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Figure 5:
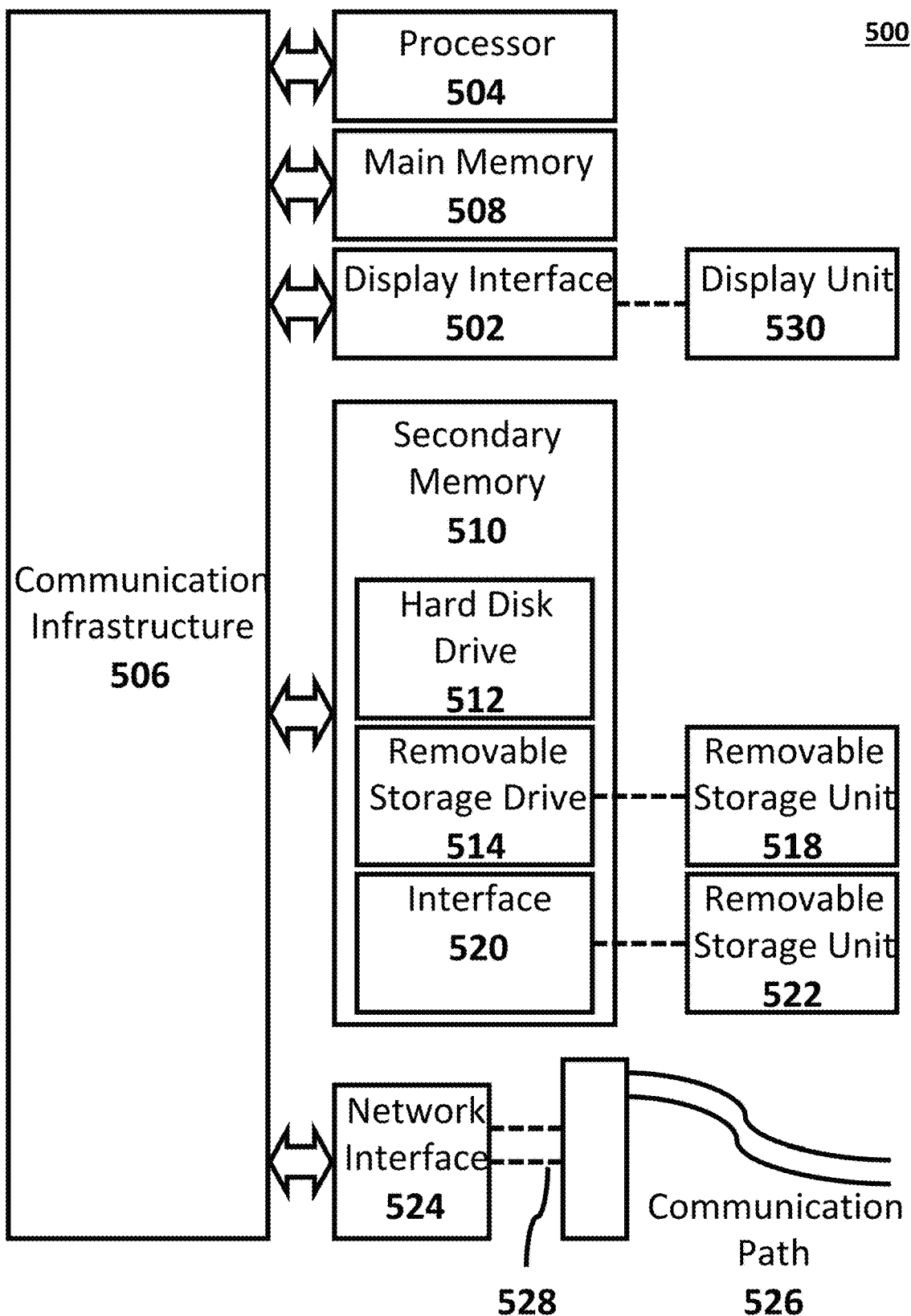
FIG. 5 illustrates an example computer system in which an embodiment of the present disclosure, or portions thereof, may be implemented as computer-readable code, consistent with exemplary embodiments of the present disclosure.

FIG. 5 shows an example computer system 500 in which an embodiment of the present disclosure, or portions thereof, may be implemented as computer-readable code, consistent with exemplary embodiments of the present disclosure. For example, processor 420 may be implemented in computer system 500 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the disclosure is described in terms of this example computer system 500. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 may be connected to a communication infrastructure 506, for example, a bus, message queue, network, or multi-core message-passing scheme.

In an exemplary embodiment, computer system 500 may include a display interface 502, for example a video connector, to transfer data to a display unit 530, for example, a monitor. Computer system 500 may also include a main memory 508, for example, random access memory (RAM), and may also include a secondary memory 510. Secondary memory 510 may include, for example, a hard disk drive 512, and a removable storage drive 514. Removable storage drive 514 may include a floppy disk drive, a magnetic tape drive, an optical disk drive, a flash memory, or the like. Removable storage drive 514 may read from and/or write to a removable storage unit 518 in a well-known manner.

Removable storage unit 518 may include a floppy disk, a magnetic tape, an optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement different embodiments of the present disclosure as discussed herein. In particular, the computer programs, when executed, enable processor device 504 to implement the processes of the present disclosure. Accordingly, such computer programs represent controllers of computer system 500. Where an exemplary embodiment of method 100 is implemented using software, the software may be stored in a computer program product and loaded into computer system 500 using removable storage drive 514, interface 520, and hard disk drive 512, or communications interface 524.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. An energy-saving elevator comprising:
   an elevator car;
   a counterweight;
   a lift cable interconnected between the elevator car and the counterweight, a first end of the lift cable connected to the elevator car, a second end of the lift cable connected to the counterweight;
   a hoist-type lifting mechanism, the lift cable connected to the hoist-type lifting mechanism, the hoist-type lifting mechanism comprising:
      a first adjustable pulley, the hoist-type lifting mechanism configured to lift the elevator car by pulling up the first end of the lift cable by rotating the first adjustable pulley in a first rotational direction;
      a second adjustable pulley, the hoist-type lifting mechanism configured to lift the counterweight by pulling up the second end of the lift cable by rotating the second adjustable pulley in a second rotational direction; and
      an adjusting cable interconnected between the first adjustable pulley and the second adjustable pulley, the first adjustable pulley and the second adjustable pulley configured to hold the adjusting cable;
   wherein the first adjustable pulley comprises:
      a first fixed conical member with a first conical surface; and
      a first moveable conical member with a second conical surface, the first moveable conical member configured to move linearly along a first axis, the first conical surface and the second conical surface facing each other, the first conical surface and the second conical surface forming a first trapezoid-shape groove between the first fixed conical member and the first moveable conical member, the first trapezoid-shape groove configured to receive the adjusting cable, the first conical surface and the second conical surface configured to hold the adjusting cable inside the first trapezoid-shape groove, the adjusting cable configured to move away from the first axis inside the first trapezoid-shape groove responsive to moving the first moveable conical member towards the first fixed conical member along the first axis, the adjusting cable configured to move towards the first axis inside the first trapezoid-shape groove responsive to moving the first moveable conical member away from the first fixed conical member along the first axis.

2. The energy-saving elevator of claim 1, wherein the second adjustable pulley comprises:
   a second fixed conical member with a third conical surface; and
   a second moveable conical member with a fourth conical surface, the second moveable conical member configured to move linearly along a second axis, the third conical surface and the fourth conical surface facing each other, the third conical surface and the fourth conical surface forming a second trapezoid-shape groove between the second fixed conical member and the second moveable conical member, the second trapezoid-shape groove configured to receive the adjusting cable, the third conical surface and the fourth conical surface configured to hold the adjusting cable, the adjusting cable configured to move away from the second axis inside the second trapezoid-shape groove responsive to moving the second moveable conical member toward the second fixed conical member along the second axis, the adjusting cable configured to move toward the second axis inside the second trapezoid-shape groove responsive to moving the second moveable conical member away from the second fixed conical member along the second axis.

3. The energy-saving elevator of claim 2, wherein:
   the first conical surface comprises a uniform first inclined surface around the first axis;
   the second conical surface comprises a uniform second inclined surface around the first axis;
   the third conical surface comprises a uniform third inclined surface around the second axis; and
   the fourth conical surface comprises a uniform a uniform fourth inclined line around the second axis.

4. The energy-saving elevator of claim 3, wherein:
   the first conical surface is bounded between a first smaller circle of the first fixed conical member and a first larger circle of the first fixed conical member, a diameter of the first smaller circle smaller than a diameter of the first larger circle;
   the second conical surface is bounded between a second smaller circle of the first moveable conical member and a second larger circle of the first moveable conical member, a diameter of the second smaller circle smaller than a diameter of the second larger circle;
   the third conical surface is bounded between a third smaller circle of the second fixed conical and a third larger circle of the second fixed conical member, a diameter of the third smaller circle smaller than a diameter of the third larger circle; and
   the fourth conical surface is bounded between a fourth smaller circle of the second moveable conical member and a fourth larger circle of the second moveable conical member, a diameter of the fourth smaller circle smaller than a diameter of the fourth larger circle.

5. The energy-saving elevator of claim 4, wherein:
   the first fixed conical member comprises a first front surface, the first front surface comprising a circular shape, an outer circle of the first front surface coinciding the first smaller circle;
   the first moveable conical member comprises a second front surface, the second front surface comprising a circular shape, an outer circle of the second front surface coinciding the second smaller circle;

the second fixed conical member comprises a third front surface, the third front surface comprising a circular shape, an outer circle of the third front surface coinciding the third smaller circle; and the second moveable conical member comprises a fourth front surface, the fourth front surface comprising a circular shape, an outer circle of the fourth front surface coinciding the fourth smaller circle.

6. The energy-saving elevator of claim 5, wherein:
the first front surface faces the second front surface; and
the third front surface faces the fourth front surface.

7. The energy-saving elevator of claim 6, further comprising:
a first rod, a main axis of the first rod coinciding with the first axis, the first fixed conical member mounted fixedly on the first rod, the first moveable conical member mounted slidably on the first rod; and
a second rod, a main axis of the second rod coinciding with the second axis, the second fixed conical member mounted fixedly on the second rod, the second moveable conical member mounted slidably on the second rod.

8. The energy-saving elevator of claim 7, further comprising:
a first sheave mounted on the first rod by utilizing a first idler bearing, the first idler bearing disposed between the first sheave and the first rod, the first idler bearing configured to urge the first sheave to rotate around the first axis synchronously with the first rod responsive to clockwise rotation of the first rod around the first axis, the first rod remaining stationary responsive to counterclockwise rotation of the first rod around the first axis; and
a second sheave mounted on the second rod by utilizing a second idler bearing, the second idler bearing disposed between the second sheave and the second rod, the second idler bearing configured to urge the second sheave to rotate around the second axis synchronously with the second rod responsive to counterclockwise rotation of the second rod around the second axis, the second rod remaining stationary responsive to clockwise rotation of the second sheave around the second axis;
wherein the first sheave and the second sheave are configured to hold the lift cable, the lift cable wrapped around the first sheave and the second sheave.

9. The energy-saving elevator of claim 8, further comprising:
a first actuator attached to the first moveable conical member, the first actuator configured to move the first moveable conical member along the first axis; and
a second actuator attached to the second moveable conical member, the second actuator configured to move the second moveable conical member along the second axis.

10. The energy-saving elevator of claim 9, wherein:
the first adjustable pulley is configured to rotate around the first axis; and
the second adjustable pulley is configured to rotate around the second axis.

11. The energy-saving elevator of claim 10, wherein the first axis is parallel to the second axis.

12. The energy-saving elevator of claim 11, further comprising an electromotor, the electromotor configured to:
rotate the first adjustable pulley around the first axis; and
rotate the second adjustable pulley around the second axis.

13. The energy-saving elevator of claim 12, wherein the electromotor comprises a drive gear, the drive gear configured to move along a third axis, the third axis parallel to the first axis and the second axis.

14. The energy-saving elevator of claim 13, further comprising:
a first gear connected to the first adjustable pulley, the electromotor configured to be engaged with the first gear responsive to the drive gear being in a first position along the third axis; and
a second gear connected to the second adjustable pulley, the electromotor configured to be engaged with the second gear responsive to the drive gear being in a second position along the third axis.

15. The energy-saving elevator of claim 14, wherein the electromotor configured to:
rotate the first adjustable pulley around the first axis responsive to the electromotor being engaged with the first gear; and
rotate the second adjustable pulley around the second axis responsive to the electromotor being engaged with the second gear.

16. The energy-saving elevator of claim 15, further comprising:
a first weight sensor associated with the elevator car, the first weight sensor configured to measure a weight of the elevator car; and
a second weight sensor associated with the counterweight, the second weight sensor configured to measure a weight of the counterweight.

17. The energy-saving elevator of claim 16, further comprising one or more processors configured to:
receive a first set of data associated with the weight of the elevator car from the first weight sensor;
receive a second set of data associated with the weight of the counterweight from the second weight sensor;
control the first actuator and the second actuator based on the first set of data and the second set of data; and
control a position of the electromotor along the third axis based on the first set of data and the second set of data.

* * * * *